United States Patent
Fleck et al.

[19]

[11] Patent Number: 6,076,159

[45] Date of Patent: Jun. 13, 2000

[54] EXECUTION OF A LOOP INSTRUCTING IN A LOOP PIPELINE AFTER DETECTION OF A FIRST OCCURRENCE OF THE LOOP INSTRUCTION IN AN INTEGER PIPELINE

[75] Inventors: Rod G. Fleck, Mountain View, Calif.; Ole H. Moller, Lyngby, Denmark; Gigy Baror, Ramat Gan, Israel

[73] Assignee: Siemens Aktiengesellschaft, Munich, Germany

[21] Appl. No.: 08/928,766

[22] Filed: Sep. 12, 1997

[51] Int. Cl.[7] .................................................. G06F 9/00
[52] U.S. Cl. .............................. 712/241; 712/213; 712/23
[58] Field of Search ..................... 395/800.23, 800.24, 395/391, 389; 712/23, 24, 213, 215, 206, 241

[56] References Cited

U.S. PATENT DOCUMENTS

| | | | |
|---|---|---|---|
| 4,967,339 | 10/1990 | Fukumaru et al. | 712/210 |
| 5,163,139 | 11/1992 | Haigh et al. | 712/206 |
| 5,404,469 | 4/1995 | Chung et al. | 395/375 |
| 5,546,593 | 8/1996 | Kimura et al. | 395/800 |
| 5,560,028 | 9/1996 | Sachs et al. | 395/800 |

FOREIGN PATENT DOCUMENTS 0 473 420 A2  4/1992  European Pat. Off. .

OTHER PUBLICATIONS

Love, Carl E. et al., "An Investigation of Static Versus Dynamic Scheduling", CH2887–8/90/0000/0192, 1990 IEEE 192–201.

*Primary Examiner*—John A. Follansbee

[57] ABSTRACT

A data processor is disclosed which comprises a first pipeline for decoding and executing data instructions, a second pipeline for decoding and executing address instructions, a unit for issuing multiple instructions to the pipelines, a first set of registers being coupled with the first pipeline, and a second set of registers being coupled with the second pipeline, wherein first and second pipeline process data in parallel.

15 Claims, 8 Drawing Sheets

FIG_1

FIG_2

FIG_3

FIG_4

FIG_5A

FIG_5B

FIG_5C

FIG_5D

FIG_5E

FIG_5F

EXECUTION OF A LOOP INSTRUCTING IN A LOOP PIPELINE AFTER DETECTION OF A FIRST OCCURRENCE OF THE LOOP INSTRUCTION IN AN INTEGER PIPELINE

BACKGROUND OF THE INVENTION

The present invention relates to a data processor and, in particular, to a central processing unit (CPU) such as a microcomputer or microcontroller. Microcontrollers are well known in the art, and a large variety of such devices from low end devices ( e.g., a ⅛-bit controller) to high end devices (e.g., a 32-bit controller) are available. High end controllers are used in almost any kind of electronic devices, such as laser printers and hard disks or for controlling any kind of processes, for example, in automobiles, etc.

With more complex tasks to be solved, the demand for very fast, high end controllers is rising. In particular, such devices are necessary to control real time applications. In such applications, it is necessary to process data very fast. It is known in the art of microcomputers and microcontrollers to use the so called pipeline technique to speed up data processing. It is also known to use multiple pipelines in parallel to process data even faster.

A highly parallel and pipelined computer processor, for example, is a very long instruction word (VLIW) processor as disclosed in U.S. Pat. No. 5,450,556. Such a VLIW processor has a plurality of arithmetic and logic units which process instruction in parallel to speed up the operation of the computer. Therefore, a multi-port register file is connected to a plurality of units as shown in FIG. 1 of the above mentioned disclosure. To process all instructions which are issued in parallel to the respective units correctly a number of precautions, for example dependency checks, completion analysis, resource checks, etc., have to be taken. In VLIW machines, these precautions are mostly shifted to the software side, and they produce lots of code size due to their hardware concept.

Another example for high speed microprocessors or microcontrollers are superscalar machines. Their multiple pipeline design requires, for example a dependency analysis to assure whether instructions issued in parallel are dependent on each other. Also, so called register renaming might be necessary if two instructions read from to the same register. To get the optimal performance it is often necessary to execute instructions out of order, which has to be checked in order not to violate a program order. To support instruction look ahead and internal data forwarding, which are needed to schedule instructions through the multiple pipelines simultaneously so called reservation stations and reorder buffers are necessary. All these precautions and others result in an either very complicate structure including additional hardware and/or in compilers which are able to analyze a program and issue the respective optimized assembler code. These precautions are cumbersome and increase the price of a microcontroller and/or its tools.

SUMMARY OF THE INVENTION

Therefore, it is an object of the present invention to provide a data processor with the capability of very fast execution without the necessity every precaution mentioned above.

This object is accomplished by a data processor which comprises a first pipeline for decoding and executing data instructions, a second pipeline for decoding and executing address instructions, a unit for issuing multiple instructions to said pipelines, a first set of registers being coupled with said first pipeline, and a second set of registers being coupled with said second pipeline, wherein first and second pipeline process data in parallel.

It is further an object of the present invention to provide a method of executing instructions with a data processor with the capability of very fast execution.

This is achieved by a method of executing multiple instructions with a data processor comprising a first pipeline for decoding and executing data instructions, a second pipeline for decoding and executing address instructions, a unit for issuing multiple instructions to said pipelines, and a first set of registers being coupled with said first pipeline and a second set of registers being coupled with said second pipeline whereby the method comprises the steps of:

analyzing the instruction stream by means of the issue unit, issuing for each pipeline one instruction in parallel only if a predefined order of the instruction stream is given whereby each pipeline receives an associated instruction from the instruction stream, otherwise issuing a no operation instruction to the respective other pipeline, and executing said instructions being issued to said pipelines in parallel.

In a further embodiment the data processor according to the invention comprises a third pipeline which is capable of executing a loop instruction in parallel with the other two pipeline units.

The data processor and the method of executing multiple instructions require only a minimized dependency analysis. Renaming of registers is not necessary. Also, no out of order execution is provided. By providing a primary decoding of any instruction by its most significant bit, a quick distribution of the instructions to the respective pipelines is possible. By providing synchronized pipeline units the expense of hardware for controlling the pipelines is further minimized. Therefore, an arrangement according to the present invention is ideal for a digital signal processor.

DESCRIPTION OF THE PREFERRED EMBODIMENT

Figure 1:
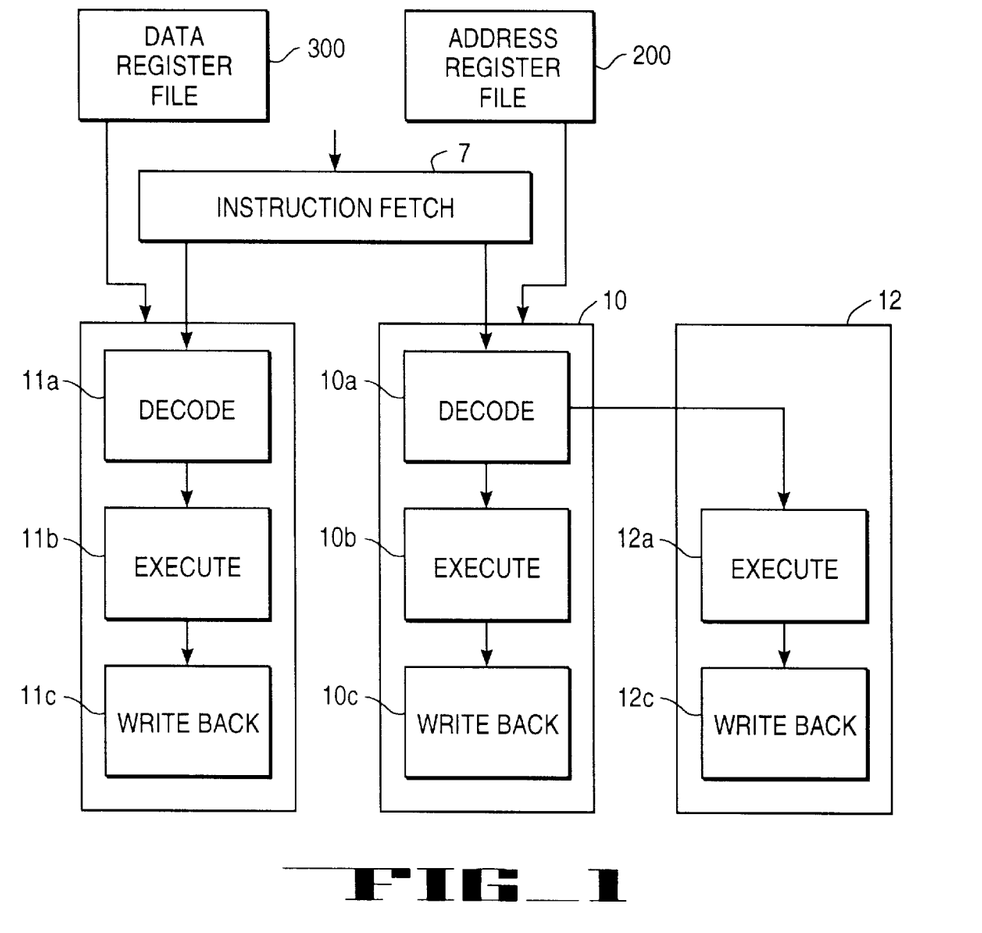
FIG. 1 shows a basic block diagram of a superscalar pipeline structure according to the present invention.

FIG. 1 shows a basic diagram of the pipeline system according to a preferred embodiment of a super-scalar 32 bit microcontroller. Three pipelines 10, 11, and 12 are provided. The basic two pipelines are pipeline 10 which handles address instructions and pipeline 11 which handles data instructions. Address instruction primarily use the address register file and most of the instructions are load/store instructions. Data instructions primarily use the data register file and most of these instructions are integer instructions. As some instructions use either data or address registers or no register at all, for example call, return, and jump instructions, they can be executed in either pipeline unit. A third pipeline 12 handles only one kind of load/store instructions, namely loop instructions. Pipelines 10 and 11 each comprise a decode stage 10a and 11, respectively, an execute stage 10b and 11b, respectively and a write back stage 10c and 11c, respectively. The third pipeline comprises only an execute stage 12a and a write back stage 12c. The loop pipeline 12 can of course comprise three stages like the other pipelines, but in this embodiment such additional hardware is not necessary as will be explained below. An address register file 200 is coupled to the load/store pipeline 10 and to the loop pipeline 12, whereas a data register file 300 is coupled to integer pipeline 11. For a better overview buffer registers and address as well as data forwarding registers and their connection are not shown in FIG. 1. They will be explained in more detail below. A instruction fetch unit 7 provides the pipelines 10, 11, and 12 with the respective instructions.

Figure 2:
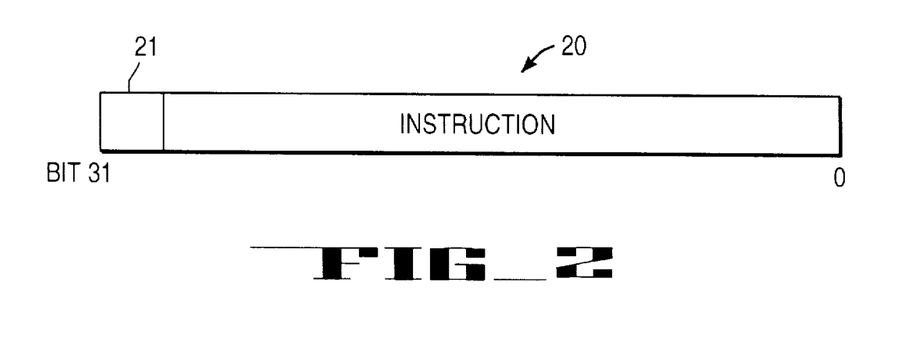
FIG. 2 shows a basic instruction word.

FIG. 2 shows an overview of an instruction word which has a bit width of 32 bits. The instruction proper is contained in the main body comprising bits 0 to 30, whereas bit 31, indicated by numeral 21, indicates the kind of the instruction. Of course, any of the 32 bits of the instruction word could be used as an indicator. In this embodiment two different kind of instructions can be executed in two different pipelines, namely a load/store instruction in pipeline 10 and a integer instruction in pipeline 11. The pre-decoder and instruction issue units can distinguish these instruction simply by evaluating the most significant bit 21 of each instruction word.

Figure 3:
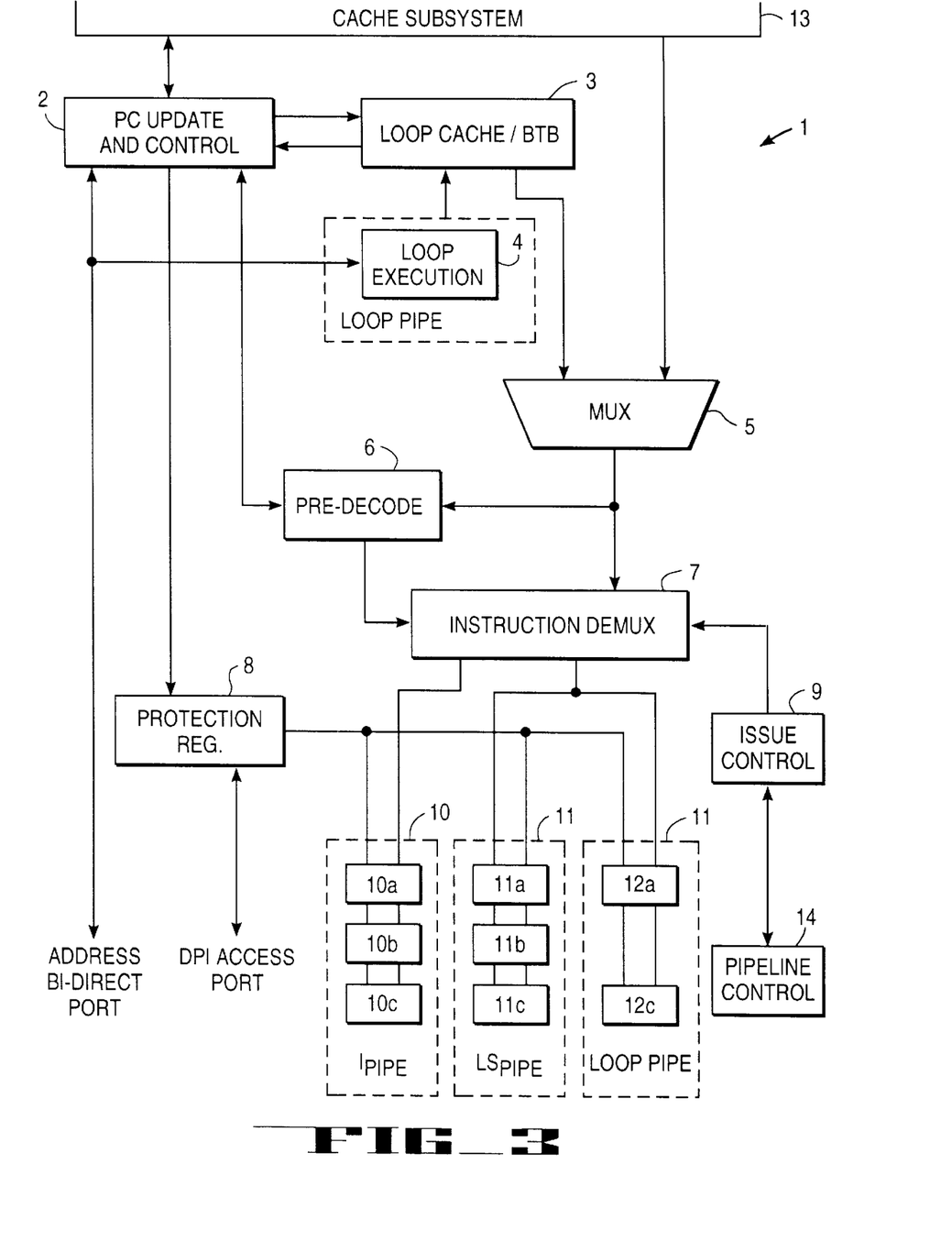
FIG. 3 shows a functional block diagram of a pipeline structure according to FIG. 1.

FIG. 3 shows the pipeline structure of FIG. 1 in more detail. It also shows main parts of the control logic which are essential for the operation of the pipelines. For a better overview, FIG. 3 shows only the main connections between these main units. Same numerals indicate the same units. In the preferred embodiment, this instruction fetch module 1 comprises the three pipeline units 10, 11 and 12 according to FIG. 1. However, the microprocessor may have only one main pipeline which includes a plurality of sub-pipelines. Also, the present invention is not limited to a certain number of pipeline stages.

An instruction demultiplexer 7, representing the instruction providing/issuing unit, provides the different pipeline units 10, 11 and 12 with their respective instructions. This instruction demultiplexer 7 is controlled by an issue control unit 9 which is coupled to a pipeline control unit 14. The instruction demultiplexer 7 is coupled to the output of a multiplexer 5 which either forwards an instruction from a cache subsystem 13 or from a loop cache buffer unit 3. The loop cache buffer unit 3 is coupled to a program control update and control unit 2 which is also coupled to the cache subsystem 13. As part of the loop pipeline 12, a loop execution unit 4 is on one hand coupled to the program counter update and control unit 2 and on the other hand to the loop cache buffer 3. The loop cache buffer 3 can also contain a branch target buffer (BTB). The output of the multiplexer 5 is connected to an input of a pre-decoder 6 which has an output which is connected to the instruction demultiplexer 7. Furthermore, the pre-decoder 6 is coupled to the program counter update and control unit 2. A protection register 8 is coupled to the program counter update and control unit 2 and to the three pipelines 10, 11 and 12. This unit 1 is responsible for feeding instructions to the different pipelines 10, 11 and 12. The main pipelines 10 and 11 of this embodiment have four stages. The first stage is formed by the instruction demultiplexer 7, the pre-decoder 6 and the logic connecting the pipelines 10, 11 and 12 with the cache subsystem 13. This stage is generally referred to as the fetch stage which issues the instructions to the respective main pipelines 10 and 11. The second stage is depicted by the units 10a and 11a and referred to as the decode stage where the instructions are decoded. The third stage is depicted by units 10b and 11b and referred to as the execute stage where the instructions are executed. In other words, the operation proper is performed by, for example, calculation of an address in a load/store instruction, or performing a multiplication. The fourth stage is depicted by units 10c and 11c and referred to as the write back stage where the results of the respective operation is written back to, for example, the register file or a memory location.

For a better overview, FIG. 3 does not show the connection between the pipelines and the register file respectively the memory sub-system. The following FIGS. 4 and 5A to 5F show how the register files are coupled to the pipelines.

Figure 4:
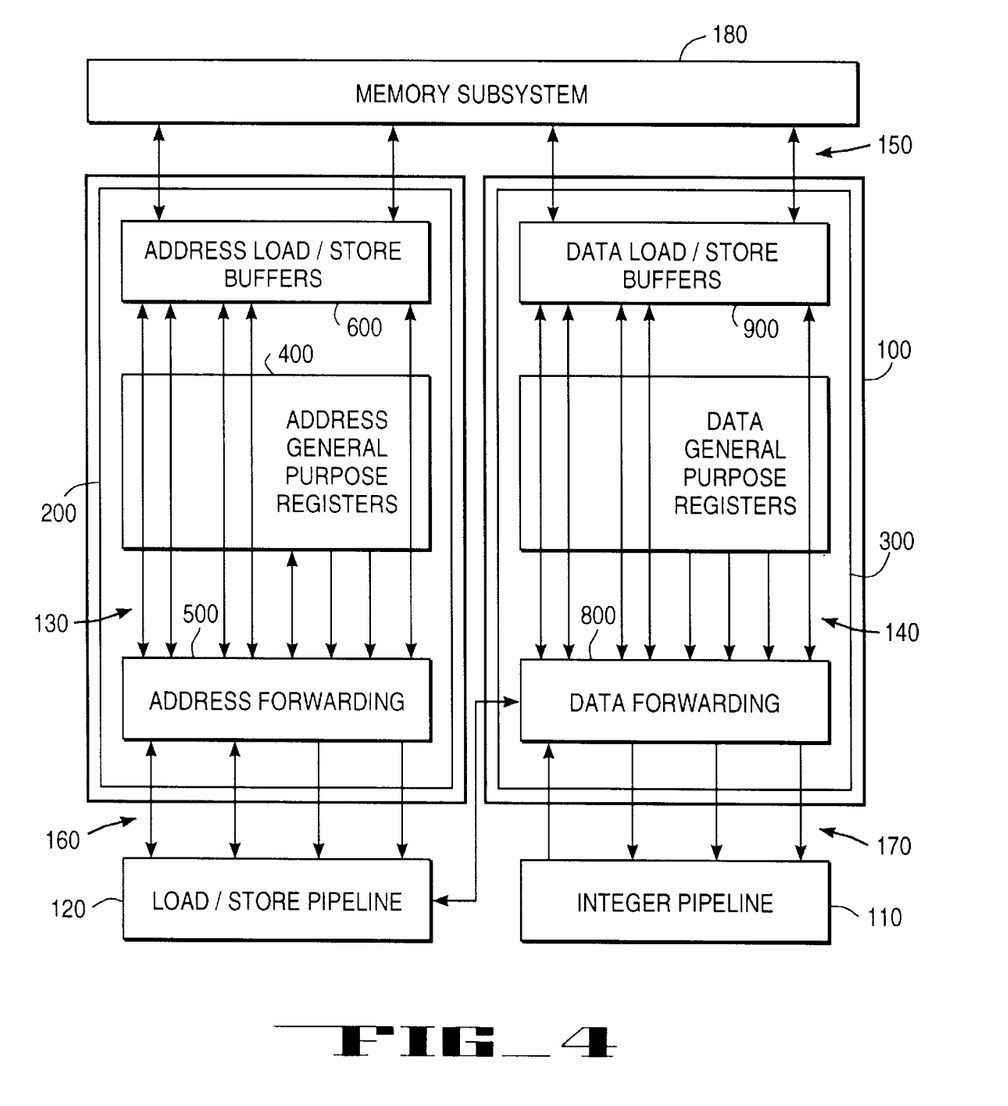
FIG. 4 shows a basic diagram of a register file connected to a memory unit and the pipeline structure.

FIG. 4 shows an overview of the general purpose register file of a 32 bit microcontroller and its connections to a memory sub-system and the integer and the load/store pipelines according to an preferred embodiment. The general purpose register file 100 comprises an address register file 200 and a data register file 300 that contain a plurality of address and data registers 400, 700 with a predetermined bit width and buffers 500, 600, 800, 900. In the preferred embodiment the register bit width is 32 bits, and the number of registers is 16. This bit width can be any bit size according to the specification of the respective microcontroller, microprocessor or data handling unit.

On the one hand, the address registers 400 are connected via a bus 130 to an address forward unit 500 and on the other hand to address load and store buffer 600. Further, the data register file 100 contains a plurality of data registers 700, for example, 16 data registers with a bit width of 32 bit. A second bus 140 is provided which connects the data registers 700 on the one hand to data load and store buffers 900 and on the other hand to data forward unit 800. The general purpose register file 100 is on the one hand connected to a data memory unit 180 through a third bus 150 and on the other hand to additional buses 160, 170. Bus 160 connects the address forward buffers 500 and parts of the data forward buffers 800 to a load/store pipeline unit 120 comprising, for example, an address arithmetic unit and an instruction fetch unit (IFU). Bus 170 connects the data forward buffers 800 to an unit 110 comprising, for example, a multiply accumulator (MAC) and an integer execution unit. Additional buses 160A and 170A connect the address register file with bus 170 and the integer pipeline and the data register file with bus 160 and the load/store pipeline. These buses 160A and 170A can be used to transfer the content of data registers or a result of the integer pipeline to any address register in the address register file 200 or the content of an address register or a result of the load/store pipeline to anyone of the data registers in the data register file 300 and vice versa. Usually one of these busses, for example bus 170A, is sufficient and the other one can be omitted.

FIGS. 5A through 5F depict an embodiment of a register file 100 showing the elements in more detail. Only one bit of each register d0 . . . d15, a0 . . . a15 is shown in this diagram. The other 31 bits of the register d0 . . . d15, a0 . . . a15 are arranged in parallel. Throughout the FIGS. 5A to 5F the same numerals represent the same elements.

Figure 5A:
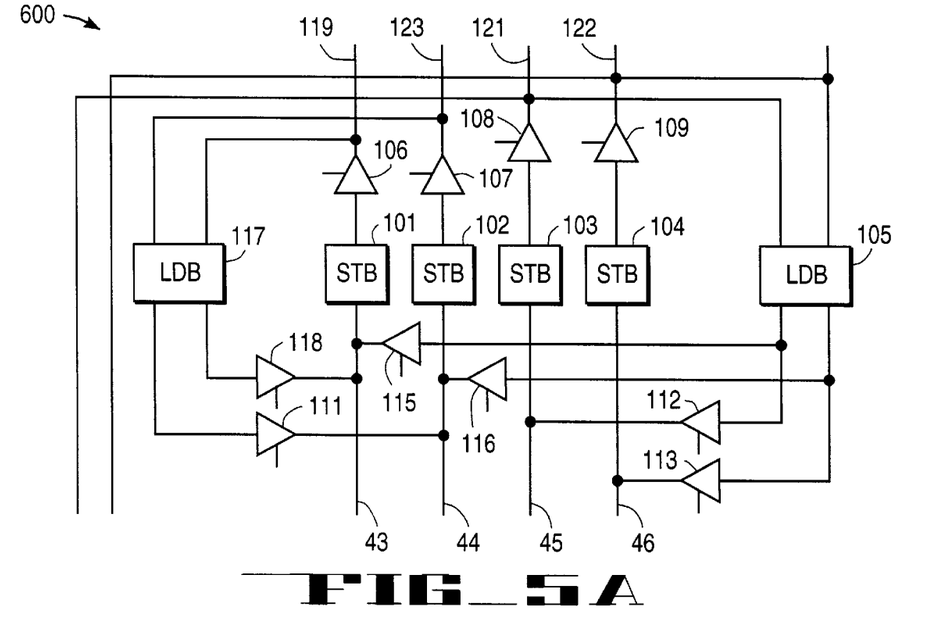
FIGS. 5A to 5F shows an embodiment of the register file of FIG. 4 in more detail.
Figure 5B:
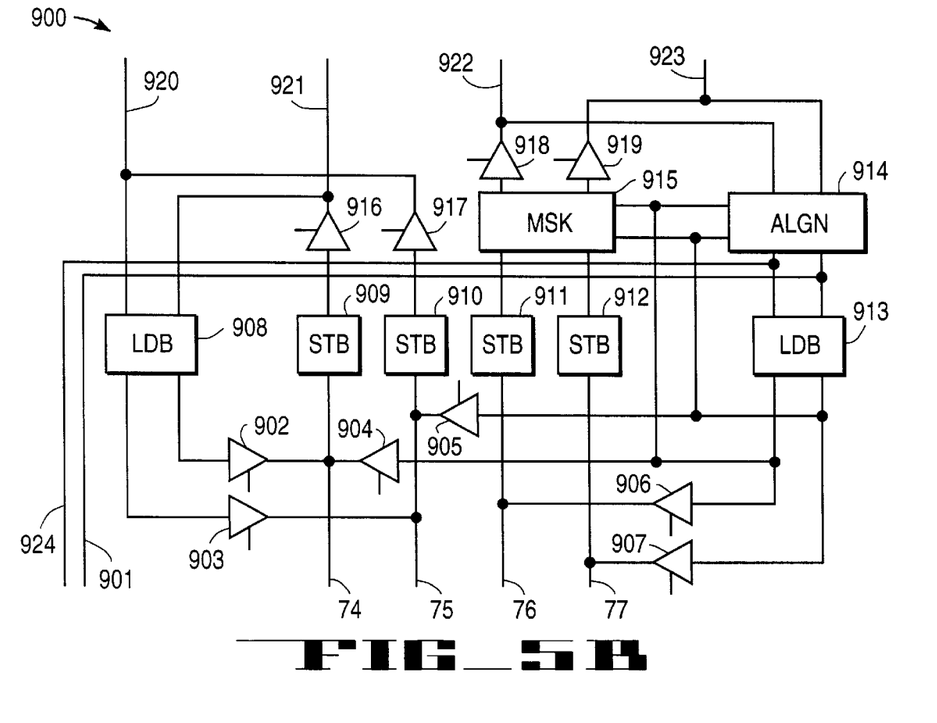
Figure 5C:
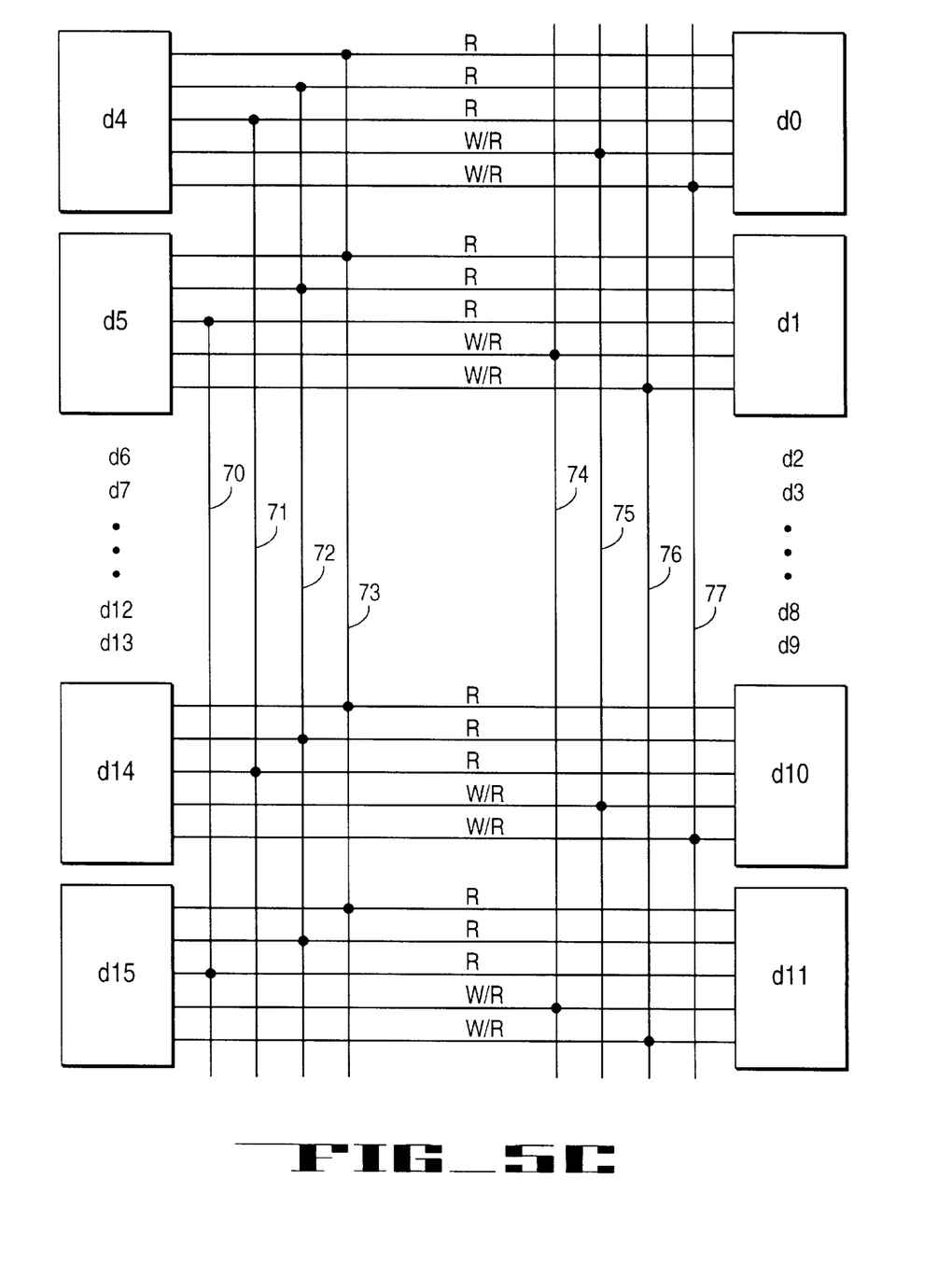
Figure 5D:
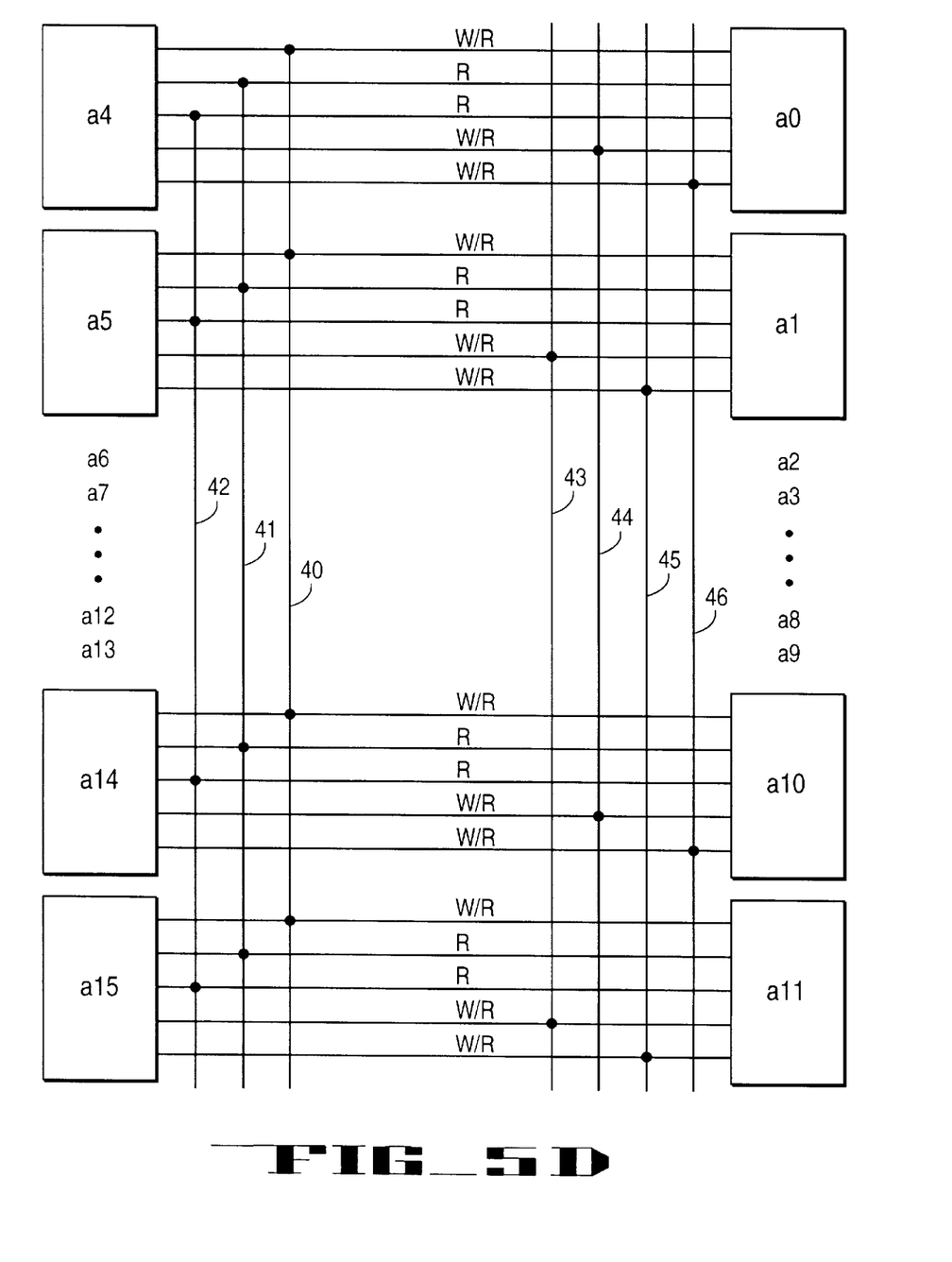

FIG. 5D shows registers in an address register file. For a better overview, registers a2 to a13 are not shown in FIG. 5D. Every address register a0, . . . a15 of the address register file 400 has two unidirectional outputs for reading and three bidirectional I/O-ports. One internal bus line 40 is connected to the first bidirectional I/O-port of all address registers a0, . . . a15, and two lines 41 and 42 are connected to the respective two outputs of all address registers a0, . . . a15. Further, two internal bus lines 44 and 46 are connected to respective I/O-ports of all even address registers a0, a2, a4 . . . a14. Two more lines 43 and 45 which are connected to the I/O-ports of all odd address registers a1, a3, a5 . . . a15.

FIG. 5A shows the address load and store buffer 600 of FIG. 1 in detail. Bus lines 43 to 46 connect to the respective inputs of store buffers 101 to 104. The outputs of store buffers 101 to 104 are connected to memory bus lines 119, 121, 122, and 123 through drivers 106 to 109. All drivers are tri-state drivers which are provided with a control input for selective activation by means of a control unit (not shown). Two blocks 117 and 105 indicate 4 load buffers which are connected on the one hand to the memory bus lines 119, 121, 122, and 123 and on the other hand through drivers 118, 111, 112, and 113 to the internal bus lines 43 to 46. In addition, the outputs of the load buffer 105 are connected through buffers 115 and 116 to the internal bus lines 43 and 44.

Figure 5E:
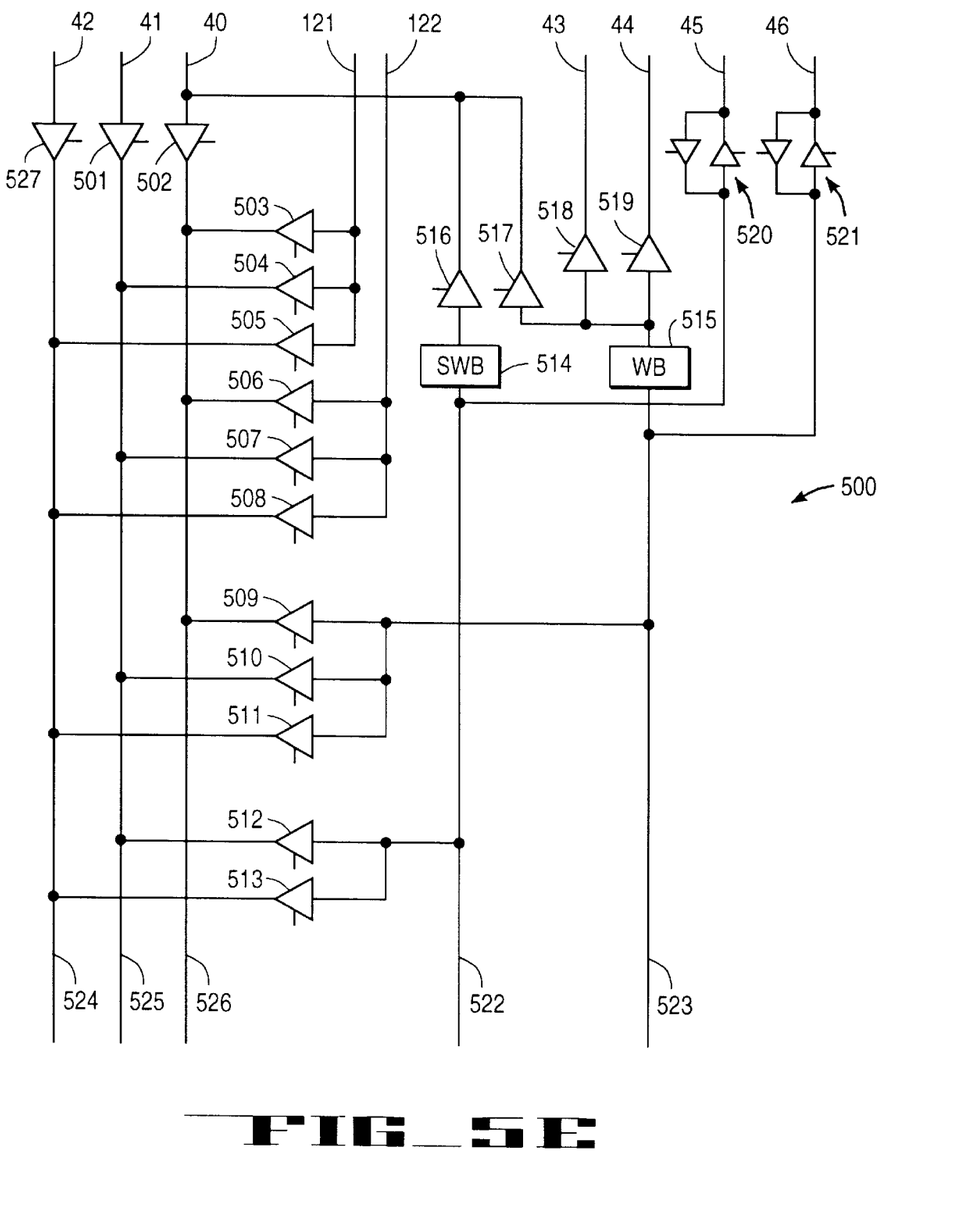

FIG. 5E shows the address forward unit 500 of FIG. 4 in detail. Bus lines 40, 41 and 42 are connected to address forward output bus lines 524, 525 and 526 through drivers 527, 501 and 502, respectively. Two memory bus lines 121 and 122 are each connected to the input of three drivers 503, 504, 505 and 506, 507, 508. The outputs of drivers 503 and 506 connect to bus line 526, the outputs of drivers 504 and 507 to bus line 525 and the outputs of drivers 505 and 508 to bus line 524. Internal bus lines 43 and 44 are connected to the outputs of two drivers 518 and 519, respectively. The inputs of drivers 518 and 519 are connected to the output of a write-back buffer 515 the input of which is connected to an address forward bus input line 523. Two other drivers 516 and 517 are provided the output of which are coupled with the internal bus line 40. The input of driver 517 is connected to the output of buffer 515. The input of driver 516 is connected to the output of buffer 514 the input of which is connected to address forward bus input line 522. Bus lines 45 and 46 are also connected to bus lines 522 and 523 through bidirectional drivers 520 and 521, respectively. The signal on bus line 523 is also fed to the inputs of three drivers 509, 510 and 511 the outputs of which are connected to bus lines 524, 525 and 526, respectively. The signal on bus line 522 is also fed to the inputs of two drivers 512 and 513 the outputs of which are connected to bus lines 524 and 525, respectively. Again, all drivers are tri-state drivers which are provided with a control input for selecting by means of a control unit (not shown). The three units 400, 500 and 600, according to FIG. 4, show the path of the address signals into and out of the address register file, whereby bus lines 119 to 122, according to FIG. 5A, connect to the memory unit 180 and bus lines 522 to 524 to the address arithmetic pipe and the instruction forward unit 120.

FIG. 5C shows data registers in a data register file. Again, for a better overview, registers d2 to d13 are not shown in FIG. 5C. Every data register d0, . . . d15 of the data register file 500 has three unidirectional outputs for reading and two bidirectional I/O-ports. Two lines 72 and 73 are connected to the first two outputs of all data registers d0, . . . d15, respectively. Further, an internal bus lines 71 is connected to respective outputs of all even data registers d0, d2, d4 . . . d14, whereas an internal bus line 70 is connected to respective outputs of all odd registers d1, d3, . . . d15. Two more lines 74 and 76 are connected to the I/O-ports of all odd address registers d1, d3, d5 . . . d15. Finally, two other lines 75 and 77 are connected to the I/O-ports of all even address registers d0, d2, d4 . . . d14.

FIG. 5B shows the data load and store buffer 900 of FIG. 4. Internal bus lines 74 to 77 are coupled to the inputs of four store buffers 909 to 912, respectively. The output of store buffer 909 is coupled to a memory bus line 921 through a driver 916, and the output of store buffer 910 is coupled to a memory bus line 920 through driver 917. The outputs of buffers 911 and 912 are connected to two input terminals of a mask unit 915. Mask unit 915 is provided with two input and two output terminals. The two output terminals of the mask unit 915 are coupled to two memory bus lines 922 and 923 through drivers 918 and 919, respectively. Two blocks 908 and 913 depict four load buffers. Block 913 is provided with two input terminals which are connected to two internal bus lines 924 and 901, respectively and to the memory bus lines 922 and 923 through an align block 914. The align block 914 is provided with two inputs which are connected to the inputs of mask unit 915 and the outputs of the store buffer 913, respectively. Furthermore, one output of load buffer 913 is coupled to internal bus lines 74 and 76 through respective drivers 904 and 906. The other output of load buffer 913 is coupled to internal bus lines 75 and 77 through drivers 905 and 907. The second load buffer 908 is connected on its input side to memory bus lines 920 and 921, respectively and on its output side to internal bus lines 74 and 75 through drivers 902 and 903, respectively. Again, all drivers are tri-state drivers which are provided with a control input for selecting by means of a control unit (not shown).

Figure 5F:
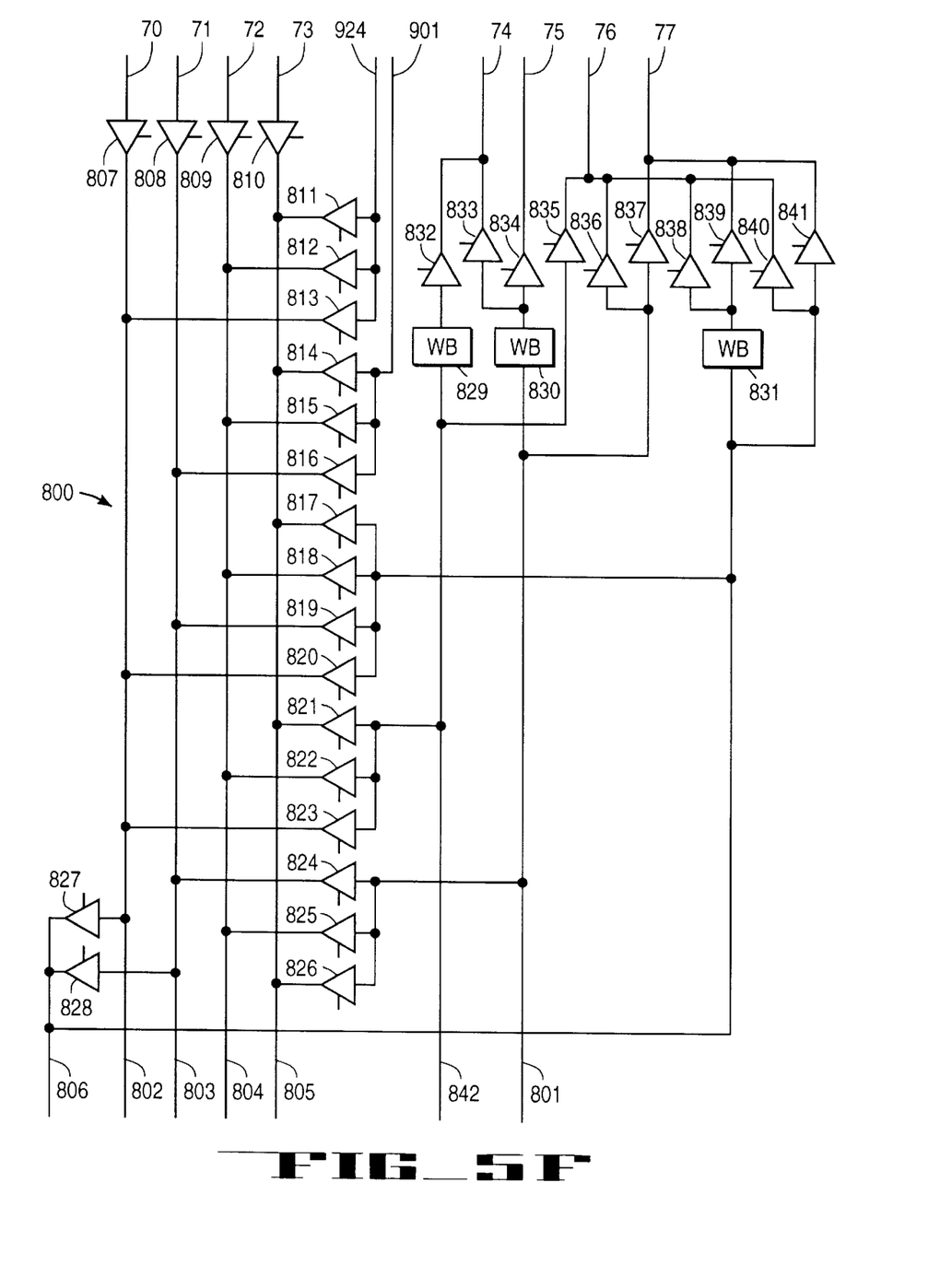

FIG. 5F shows data forward unit 800 of FIG. 4 in detail. Internal bus lines 70 to 73 are coupled with the data forward bus lines 802 to 805 through drivers 807 to 810. An additional data forward bus line 806 is connected to output terminals of drivers 827 and 828 the input terminals of which are connected to bus lines 802 and 803, respectively. Bus line 806 is part of the bus 170A, according to FIG. 4, which is connected to the load/store pipeline 120 to build a coupling between address register file 200 and data register file 300. Bus 160A is not implemented in this embodiment. Bus line 924 is connected to the inputs of three drivers 811, 812 and 813 the outputs of which are connected to bus lines 805, 804 and 802, respectively. Bus line 901 is connected to the inputs of three drivers 814, 815 and 816 the outputs of which are connected to bus lines 805, 804 and 803, respectively. Two other data forward bus lines 842 and 801 are provided which are coupled to the input terminals of two write-back buffers 829 and 830, respectively. The output terminals of buffers 829 and 830 are coupled to bus lines 74 and 75 through drivers 832 and 834, respectively. In addition, the output of buffer 830 is coupled to bus line 74 through a driver 833. Bus line 842 is coupled to bus line 76 through driver 835, and bus line 801 is also coupled to bus lines 76 and 77 through drivers 836 and 837, respectively. Also, bus line 806 is coupled to bus lines 76 and 77 through drivers 840 and 841, respectively. Furthermore, bus line 806 is connected to the input terminal of a further write-back buffer 831 the output of which is coupled to bus lines 76 and 77 through drivers 838 and 839, respectively. Also, bus line 806 is coupled to bus lines 802 to 805 through drivers 817 to 820, respectively. Finally, bus line 842 is coupled to bus lines 805, 804 and 802 through drivers 821 to 823, respectively and bus line 801 is coupled to bus lines 803 to 805 through drivers 824 to 826, respectively. Again, all drivers are tri-state drivers which are provided with a control input for selecting by means of a control unit (not shown). The memory bus lines 119 to 122, according to FIG. 5A, and 920 to 923, according to FIG. 5B, form the memory bus 150 of FIG. 4. The bus lines 522 to 526, according to FIG. 5E, and 806 form bus 160 and bus lines 842 and 801 to 805 form bus 170 of FIG. 4.

The 32 bit microprocessor in this preferred embodiment contains two major pipelines 10 and 11. The first data pipeline 11 deals with the data arithmetic instructions, the multiply accumulator operations, the data conditional jumps, and the system instructions. The second address pipeline 10 deals with address arithmetic instructions, loads, stores, unconditional jumps, address conditional jumps, calls, returns, and loops. The core is capable of issuing one instruction into the decode stage 10a and 11a of each pipeline 10 and 11 per cycle. However, in this embodiment, this is constrained by resource constrains such as two back to back arithmetic instructions will be issued on separate cycles and an instruction which is issued to the load store pipeline 10 may only be issued on its own or as the second of a pair. If only one instruction can be issued then a no operation instruction is issued to the other pipeline. This allows a much less cumbersome architecture of the core of a microprocessor, whereby a software compiler can optimize code on a simple basis. In other words, only parts of the intelligence of the system are integrated in the hardware the other parts are transferred to the software compiler.

For example, an instruction stream which has not been optimized is assumed to be:

add ;instruction i1 add ;instruction i2 ld ;instruction l1 ld ;instruction l2 sub ;instruction i3 whereby 'add' stands for an addition instruction, 'ld' stands for a load instruction, and 'sub' stands for a subtraction instruction. For a better overview, no instruction parameters are shown in this example. Such an instruction stream would result in an execution as shown below in Table 1:

TABLE 1

| CYCLE | 1 | 2 | 3 | 4 | 5 | 6 | 7 |
|---|---|---|---|---|---|---|---|
| INTEGER PIPE | | | | | | | |
| Decode 11a | i1 | i2 | — | i3 | | | |
| Execute 11b | | i1 | i2 | — | i3 | | |
| Writeback 11c | | | i1 | i2 | — | i3 | |
| LOAD/STORE PIPE | | | | | | | |
| Decode 10a | — | l1 | l2 | | | | |
| Execute 10b | | — | l1 | l2 | | | |
| Writeback 10c | | | — | l1 | l2 | | |

In this table, a '-' stands for a no operation instruction. As can be seen, only instruction i2 and l1 can be issued in parallel to the both pipelines, because this sequence meets the above constraints. All other instructions are issued either to the integer pipeline 11 or the load/store pipeline 10. In general with the above described hardware, to allow multiple instruction issue, a load/store instruction must follow an integer instruction.

The preferred embodiment according to the present invention provides furthermore a third minor pipeline 12 on the load/store side which is used to handle the zero overhead loops. This pipeline 12 is used to fold out the loops from the execution flow allowing a loop operation to be performed in parallel with an integer and load/store operation. The loop pipeline 12 has no dedicated fetch stage associated with it. When a new loop is encountered the first time the loop instruction is fetched and issued to the load/store pipeline. During this first time the loop instruction is executed and the loop cache buffer 3 is set up with the loop target address and the loop detection address which is preferably the address of the instruction executed before the loop instruction proper. In later iterations this loop detection address will be compared by the loop cache with the current program counter in unit 2. On subsequent loop iterations the a loop instruction is detected by the loop cache buffer 3 and is executed in the loop execution unit 4 of the execute stage 12c of the loop pipeline 12. Therefore, while executing loops, a maximum of three instructions can be executed at the same time.

While this embodiment allows efficiently parallel execution, some restrictions apply to the embodiment described above. Pipeline stalls, data dependencies and pipeline interlocking are all handled in the decode stages of the two major pipelines 10 and 11. Each pipeline 10 and 11 can be in one of the following states during the current decode cycle: (a) normal, (b)cancel, (c) inject, (d) cancel and re-inject, (e) re-inject, (f) cancel and inject, and (g) hold.

These states (a) to (f) will be explained below:

(a) During a normal state, the current instruction in decode is issued to the execute stage and the next instruction from fetch is taken into the decode stage on the following cycle.

(b) During the cancel state, the instruction in the decode stage is aborted and a no operation instruction is issued to the execute stage. The next instruction from the instruction fetch is taken into the decode stage on the following cycle.

(c) During the inject state, the current instruction in the decode stage is issued to the execute stage and a new instruction is injected into the decode stage on the following cycle. The instructions which can be injected into the pipeline is dependent on the pipeline. Generally, only no operation instructions can be injected except a so called interrupt pseudo instruction and a exception pseudo instruction.

(d) During a cancel and inject state, the current instruction in the decode stage is aborted and a no operation is issued to the execute stage. A new instruction is injected into the decode stage on the following cycle, see the inject case above.

(e) During the re-inject state, the pipeline uses the instruction re-injection mechanism to handle multi cycle instructions. This involves the multi cycle instruction being detected in the decode stage. The instruction is re-injected into the decode stage of the pipeline on the following n cycles where n is dependent on the number of cycles the instruction takes.

(f) During the cancel and re-inject state, the current instruction in the decode stage is recycled and a no operation instruction is issued to the execute stage. In this embodiment, this is the procedure how a pipeline stall is implemented.

(g) During the hold state, the current instruction in decode will be repeated.

The conditions which determine which state a pipeline is in is dependent on the pipeline. The following description and tables give an example of how this mechanism is applied to handle pipeline stalls.

For example, a multi cycle integer operation such as a 32 bit multiply instruction are handled through re-injecting the integer operation into the decode stage 11a of the integer pipeline 11 the required number of times. The load/store pipeline 10 is automatically placed in the cancel and re-inject state when the integer pipeline 11 is in the re-inject state effectively stalling the instruction in the decode stage 10a. A instruction stream which causes such an effect is for example:

mul d0, d1, d2 ;instruction M
Id.w d3, [a0]0 ; instruction L whereby 'mul' indicates a multiply instruction and 'Id.w' indicates a load word instruction. This instruction stream would fill up the stages of the two major pipelines 10 and 11 as follows:

TABLE 2

| CYCLE | 1 | 2 | 3 | 4 | 5 | 6 | 7 |
|---|---|---|---|---|---|---|---|
| INTEGER PIPE | | | | | | | |
| Decode 11a | M | Mr1 | Mr2 | Mr3 | | | |
| Execute 11b | | M | Mr1 | Mr2 | Mr3 | | |
| Writeback 11c | | | M | Mr1 | Mr2 | Mr3 | |
| State | Rl | Rl | Rl | N | | | |
| LOAD/STORE PIPE | | | | | | | |
| Decode 10a | L | L | L | L | | | |
| Execute 10b | | | | | L | | |
| Writeback 10c | | | | | | L | |
| State | C&R | C&R | C&R | N | | | | whereby 'RI' stands for re-inject, 'C&R' stands for cancel and re-inject and 'N' stands for normal. In case of a multiply instruction followed by another integer instruction a no operation instruction would be issued instead of instruction L.

A so called read after write hazard occurs in the integer pipeline 11 when the result from a multiply accumulator instruction is not being available to any other arithmetic operation for an extra cycle. This is due to the addition in the write back stage 11c which is used to perform the accumulation function which prevents a forwarding of the multiply accumulator result from the execute stage 11b. If this hazard exits, then the integer pipeline 11 is put into the cancel and re-inject state and hence the load store pipeline 10 will also cancel and re-inject. For example an instruction stream is:

madd d0, d1, d2, d3 ;instruction M
shr d0, d0, 2 ;instruction S
Id.w d1, [a0] ;instruction L wherein 'madd' stands for a multiply and accumulate instruction which in this example adds the result of a multiplication of d2 and d3 to d1 and stores the result in d0. 'shr' stands for a shift instruction, whereby in this example d0 is shifted rightwards by 2 and the result is stored in d0. 'Id' stands for a load instruction, whereby in this example the content of the memory indicated by register a0 is loaded into register d1. This example causes the following pipeline states shown in table 3:

TABLE 3

| | CYCLE | | | | | | |
|---|---|---|---|---|---|---|---|
| | 1 | 2 | 3 | 4 | 5 | 6 | 7 |
| INTEGER PIPE | | | | | | | |
| Decode 11a | M | S | S | | | | |
| Execute 11b | | M | — | S | | | |
| Writeback 11c | | | M | — | S | | |
| State | N | C&R | N | | | | |
| LOAD/STORE PIPE | | | | | | | |
| Decode 10a | — | L | L | | | | |
| Execute 10b | | — | — | L | | | |
| Writeback 10c | | | — | — | L | | |
| State | N | C&R | N | | | | |

The above described mechanism of locking the pipelines 10, 11 and 12 facilitates the hardware necessary to control the different pipeline stages and synchronizes the pipelines 10, 11 and 12. The loss of performance is insignificant compared to the advantages in realizing such a pipeline structure in accordance with the present invention.

The address forwarding unit 500 and the data forwarding unit 800 are necessary to assure the performance when critical aspects of the pipeline behavior are taken into account. These units 500 and 800 provide so called forwarding paths for address and data. These forwarding paths allow the result of one instruction to be passed to the inputs of a following instruction without having to wait for the write and subsequent reading of the result from the register file 200 and 300. Without these forwarding paths dependent on the instruction stream the pipelines 10 and 11 may stall. For example if a second instruction following a first instruction needs the result of the first instruction the execution of the decode stage of the second instruction would stall during the execution of the execute stage of the first instruction. With the forwarding mechanism the execute stage of the first instruction forwards its result to the execute stage of the second instruction.

The data processor according to the present invention is in particular ideal for executing so called digital signal processing related instructions. Using the three pipeline units described above it is possible to calculate Fast Fourier Transformations (FFT) and Finite Impulse Response (FIR) filter operations. Such calculations need in a repeating program body often one ore more multiply instructions followed by respective load instructions. In average programs, with a data processor according to the present invention the number of instructions executed in parallel is approximately 1.8, whereas in the above mentioned filter calculations the number of instruction executed in parallel can reach between 2 and 3 instructions per cycle, because all pipelines can be filled.

What is claimed is:

1. Method of executing multiple instructions with a data processor comprising a first pipeline for decoding and executing data instructions, a second pipeline for decoding and executing address instructions, a loop pipeline for executing loop instructions, a unit for issuing multiple instructions to said pipelines, a first set of registers being coupled with said first pipeline and a second set of registers being coupled with said second pipeline whereby the method comprises the steps of:

analyzing the instruction stream by means of the issue unit, in case of a first occurrence of a loop instruction, issuing said loop instruction to the first or second pipeline and in case of any succeeding loop instruction, issuing said loop instruction to said loop pipeline, issuing for at least the loop pipeline and another pipeline one instruction in parallel only if a loop instruction follows an address instruction or a data instruction, whereby each pipeline receives an associated instruction from the instruction stream, otherwise issuing a no operation instruction to the respective other pipeline, and executing said instructions being issued to said pipelines in parallel.

2. Method according to claim 1, further issuing instructions to all pipelines in parallel if a loop instruction follows either an address instruction or a data instruction and an address instruction follows a data instruction.

3. Method according to claim 1, wherein the first bit of each instruction word indicates whether the instruction is to be issued to the first or second pipeline.

4. Method according to claim 1, wherein a call, a return, or a jump instruction can be issued to the first or the second pipeline.

5. A data processor comprising:

a first pipeline having an execution stage, a second pipeline for executing loop instructions, a unit for issuing multiple instructions to said pipelines, and wherein said second pipeline comprises a loop instruction detection unit for detecting a loop instruction, and wherein said execution stage of said first pipeline presets said loop instruction detection unit on the first occurrence of a loop instruction with specific data of said loop instruction.

6. A data processor according to claim 5 further comprising a third pipeline having an execution stage, wherein said first pipeline executes data instructions and said third pipeline executes address instructions.

7. A data processor according to claim 5 wherein said loop instruction detection unit has comparison means to detect the address of a loop instruction.

8. A data processor according to claim 5 wherein said loop instruction detection unit comprises a loop target address buffer and a loop detection address buffer.

9. Method of executing multiple instructions with a data processor comprising a first pipeline for decoding and executing instructions and a loop pipeline for executing loop instructions, a unit for issuing multiple instructions to said pipelines, whereby the method comprises the steps of:

analyzing the instruction stream by means of the issue unit, in case of a first occurrence of a loop instruction, issuing said loop instruction to the first pipeline and in case of any succeeding loop instruction, issuing said loop instruction to said loop pipeline, issuing for at least the loop pipeline and said first pipeline one instruction in parallel only if a loop instruction follows an address instruction or a data instruction, whereby each pipeline receives an associated instruction from the instruction stream, otherwise issuing a no operation instruction to the respective other pipeline, and executing said instructions being issued to said pipelines in parallel.

10. Method according to claim 9 wherein said data processor comprises a second pipeline and wherein said first pipeline is for executing data instructions and said second pipeline is for executing address instructions.

11. Method according to claim 10, further issuing instructions to all pipelines in parallel if a loop instruction follows either an address instruction or a data instruction and an address instruction follows a data instruction.

12. Method according to claim 10, wherein a call, a return, or a jump instruction can be issued to the first or the second pipeline.

13. Method according to claim 9, wherein the first bit of each instruction word indicates whether the instruction is to be issued to the first or second pipeline.

14. Method according to claim 9, wherein during execution of a first occurrence of a loop instruction the address of said loop instruction and the target address of said loop instruction is buffered.

15. Method according to claim 14, wherein during a succeeding occurrence of said loop instruction said buffered loop instruction address is used to decode a loop instruction.

* * * * *